US009278753B2

(12) United States Patent
Reckzeh et al.

(10) Patent No.: US 9,278,753 B2
(45) Date of Patent: Mar. 8, 2016

(54) WING FOR AN AIRCRAFT, AIRCRAFT AND METHOD FOR REDUCING AERODYNAMIC DRAG AND IMPROVING MAXIMUM LIFT

(71) Applicant: Airbus Operations GmbH, Hamburg (DE)

(72) Inventors: Daniel Reckzeh, Stuhr (DE); Burkhard Goelling, Buchholz i.d.N. (DE); Matthias Lengers, Bremen (DE)

(73) Assignee: Airbus Operations GmbH (DE)

( * ) Notice: Subject to any disclaimer, the term of this patent is extended or adjusted under 35 U.S.C. 154(b) by 135 days.

(21) Appl. No.: 13/851,330

(22) Filed: Mar. 27, 2013

(65) Prior Publication Data

US 2013/0320150 A1   Dec. 5, 2013

Related U.S. Application Data

(60) Provisional application No. 61/617,169, filed on Mar. 29, 2012.

(30) Foreign Application Priority Data

Mar. 29, 2012   (EP) ...................................... 12162156

(51) Int. Cl.
*B64C 23/06*   (2006.01)
*B64C 21/02*   (2006.01)

(52) U.S. Cl.
CPC ............... *B64C 23/065* (2013.01); *B64C 21/02* (2013.01); *Y02T 50/164* (2013.01); *Y02T 50/166* (2013.01)

(58) Field of Classification Search
None
See application file for complete search history.

(56) References Cited

U.S. PATENT DOCUMENTS

| | | | | |
|---|---|---|---|---|
| 1,775,757 A | * | 9/1930 | Gay | 244/207 |
| 2,477,461 A | * | 7/1949 | Lee | 244/199.3 |
| 3,025,026 A | * | 3/1962 | Nichols | 244/87 |
| 3,058,695 A | * | 10/1962 | Simonis | 244/207 |
| 3,090,584 A | * | 5/1963 | Kuchemann et al. | 244/199.1 |
| 3,097,817 A | * | 7/1963 | Towzey, Jr. | 244/15 |
| 3,142,457 A | * | 7/1964 | Quenzler | 244/203 |
| 3,319,593 A | * | 5/1967 | Papst | 114/67 R |
| 3,891,163 A | * | 6/1975 | Wilkerson et al. | 244/207 |
| 3,920,203 A | * | 11/1975 | Moorehead | 244/207 |

(Continued)

FOREIGN PATENT DOCUMENTS

| | | |
|---|---|---|
| CN | 101348170 A | 1/2009 |
| CN | 101415605 A | 4/2009 |

(Continued)

OTHER PUBLICATIONS

Chinese Office Action (CN 201310104991.3)—Jan. 7, 2015.

(Continued)

*Primary Examiner* — Medhat Badawi
(74) *Attorney, Agent, or Firm* — Lerner, David, Littenberg, Krumholz & Mentlik, LLP

(57) ABSTRACT

A wing for an aircraft includes a leading edge and a wing tip extension extending from an end of a main wing region to a wing tip. The wing tip extension includes an arrangement of openings at least from the end of a main wing region to the wing tip along the leading edge, which openings are connected to an air conveying device for conveying air through the openings. Thereby in flight states with a low flight velocity the flow around a wing tip extension can be harmonized such that the drag is decreased and the lift of the wing is increased.

14 Claims, 3 Drawing Sheets

(56) References Cited

U.S. PATENT DOCUMENTS

| | | | | |
|---|---|---|---|---|
| 3,936,013 | A * | 2/1976 | Yuan | 244/199.3 |
| 3,951,360 | A * | 4/1976 | Anxionnaz | 244/209 |
| 3,974,986 | A * | 8/1976 | Johnstone | 244/199.3 |
| 4,099,691 | A * | 7/1978 | Swanson et al. | 244/207 |
| 4,169,567 | A * | 10/1979 | Tamura | 244/17.11 |
| 4,214,722 | A * | 7/1980 | Tamura | 244/208 |
| 4,285,482 | A * | 8/1981 | Lewis | 244/207 |
| 4,382,569 | A * | 5/1983 | Boppe et al. | 244/199.4 |
| 4,477,042 | A * | 10/1984 | Griswold, II | 244/199.2 |
| 4,666,104 | A * | 5/1987 | Kelber | 244/12.1 |
| 5,039,032 | A * | 8/1991 | Rudolph | 244/35 R |
| 5,150,859 | A * | 9/1992 | Ransick | 244/58 |
| 5,158,251 | A * | 10/1992 | Taylor | 244/199.3 |
| 5,263,667 | A * | 11/1993 | Horstman | 244/209 |
| 5,590,854 | A * | 1/1997 | Shatz | 244/206 |
| 5,687,934 | A * | 11/1997 | Owens | 244/208 |
| 5,803,409 | A * | 9/1998 | Keefe | 244/206 |
| 5,803,410 | A * | 9/1998 | Hwang | 244/208 |
| 5,813,625 | A * | 9/1998 | Hassan et al. | 244/17.11 |
| 5,884,873 | A * | 3/1999 | Breit | 244/209 |
| 5,899,416 | A * | 5/1999 | Meister et al. | 244/207 |
| 6,109,565 | A * | 8/2000 | King, Sr. | 244/207 |
| 6,135,395 | A * | 10/2000 | Collett | 244/209 |
| 6,216,982 | B1 * | 4/2001 | Pfennig et al. | 244/130 |
| 6,234,751 | B1 * | 5/2001 | Hassan et al. | 416/42 |
| 6,622,973 | B2 * | 9/2003 | Al-Garni et al. | 244/206 |
| 6,752,358 | B1 * | 6/2004 | Williams et al. | 244/208 |
| 6,892,989 | B1 * | 5/2005 | Whitmore et al. | 244/200 |
| 7,004,094 | B2 * | 2/2006 | Carson | 114/67 A |
| 7,152,829 | B2 * | 12/2006 | Bertolotti | 244/209 |
| 7,637,462 | B2 * | 12/2009 | Pal | 244/199.2 |
| 7,735,782 | B2 * | 6/2010 | Kloker et al. | 244/209 |
| 7,766,280 | B2 * | 8/2010 | Cloft et al. | 244/208 |
| 7,850,126 | B2 * | 12/2010 | Crouch et al. | 244/200 |
| 7,866,609 | B2 * | 1/2011 | Parikh | 244/209 |
| 8,033,510 | B2 * | 10/2011 | Shmilovich et al. | 244/208 |
| 8,251,319 | B2 * | 8/2012 | Jonker et al. | 244/208 |
| 8,382,043 | B1 * | 2/2013 | Raghu | 244/207 |
| 8,573,542 | B2 * | 11/2013 | Brown | 244/207 |
| 8,651,813 | B2 * | 2/2014 | Long | 416/90 A |
| 8,844,264 | B2 * | 9/2014 | Khalid | 60/226.1 |
| 8,864,082 | B2 * | 10/2014 | Syassen | 244/209 |
| 2007/0051855 | A1 | 3/2007 | Shmilovich et al. | |
| 2007/0084297 | A1 * | 4/2007 | Powell | 73/861 |
| 2009/0230251 | A1 * | 9/2009 | Bonnaud et al. | 244/198 |
| 2010/0104436 | A1 * | 4/2010 | Herr et al. | 416/31 |
| 2010/0115820 | A1 * | 5/2010 | Perevoshchikov et al. | 43/4.5 |
| 2010/0176249 | A1 * | 7/2010 | Schwetzler | 244/199.1 |
| 2010/0219296 | A1 * | 9/2010 | Shelman-Cohen | 244/130 |
| 2010/0294891 | A1 * | 11/2010 | Kelm | 244/199.4 |
| 2010/0303634 | A1 | 12/2010 | Long | |
| 2012/0045329 | A1 * | 2/2012 | Smith et al. | 416/1 |
| 2013/0153711 | A1 * | 6/2013 | Wooden et al. | 244/199.2 |
| 2013/0284273 | A1 * | 10/2013 | Boespflug et al. | 137/13 |
| 2013/0291981 | A1 * | 11/2013 | Lengers et al. | 137/825 |

FOREIGN PATENT DOCUMENTS

| | | |
|---|---|---|
| CN | 101896401 A | 11/2010 |
| EP | 0532093 A1 | 3/1993 |
| EP | 2167380 A1 | 3/2010 |
| WO | 2009098442 A2 | 8/2009 |
| WO | 2011/008337 A2 | 1/2011 |

OTHER PUBLICATIONS

EP 12 162 156.9 Action (Jun. 11, 2014).

European Office Action for Application No. 12162156.9 dated Mar. 13, 2015.

* cited by examiner

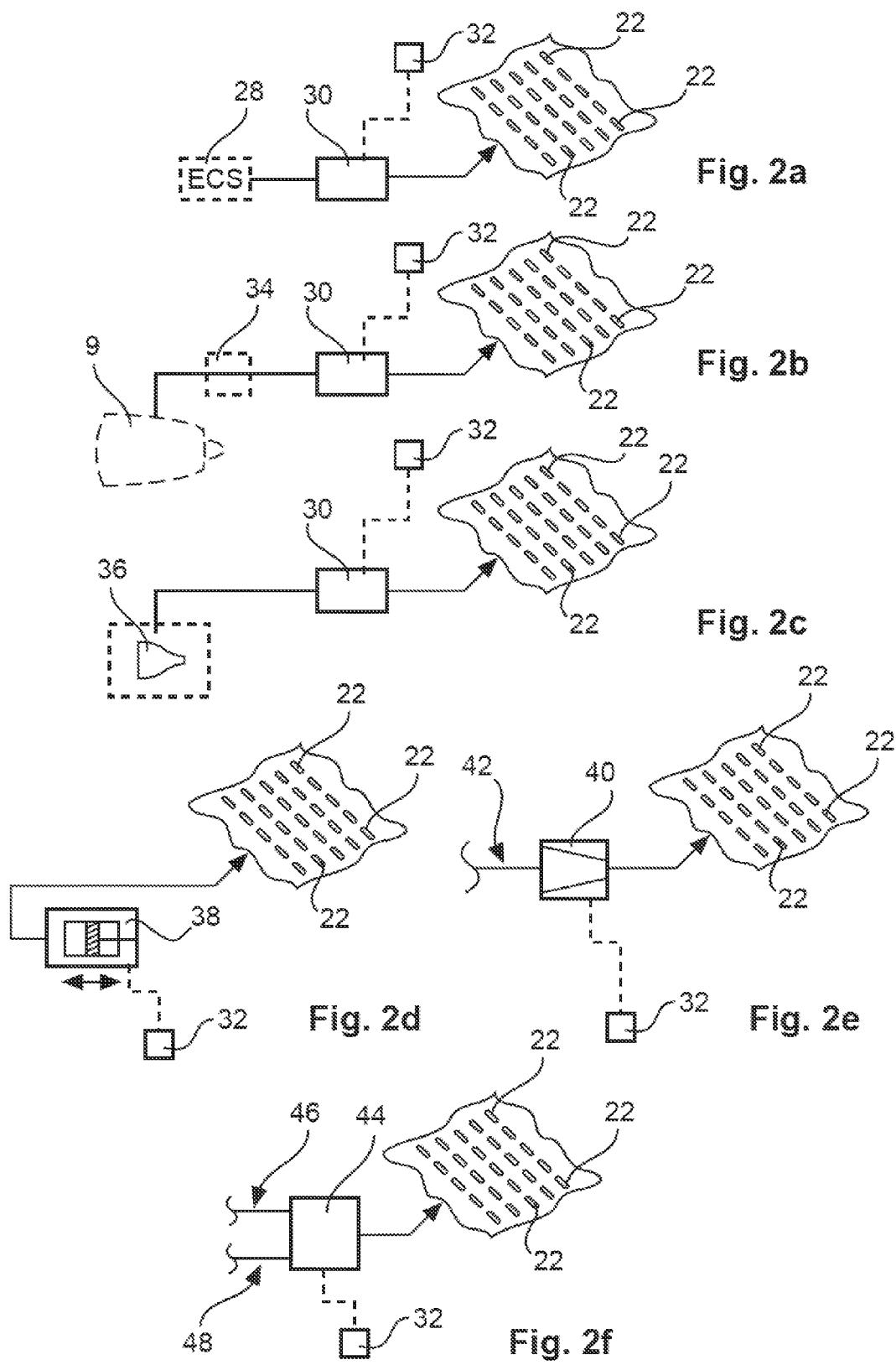

WING FOR AN AIRCRAFT, AIRCRAFT AND METHOD FOR REDUCING AERODYNAMIC DRAG AND IMPROVING MAXIMUM LIFT

CROSS-REFERENCE TO RELATED APPLICATIONS

This application claims the benefit of the filing date of European Patent Application No. 12 162 156.9 filed Mar. 29, 2012 and of U.S. Provisional Patent Application No. 61/617, 169 filed Mar. 29, 2012, the disclosure of which applications is hereby incorporated herein by reference.

TECHNICAL FIELD

The invention relates to a wing for an aircraft, an aircraft and a method for reducing aerodynamic drag and improving maximum lift.

BACKGROUND OF THE INVENTION

In commercial aircraft wing tip extensions are often installed for the purpose of improved efficiency due to a reduction of lift-induced drag and due to the increased lift generated at the wing tip. While wing tip extensions are usually designed for cruise flight conditions they may comprise an unwanted stall behavior during takeoff and landing. While the wing itself usually comprises high lift devices, e.g. in the form of slats arranged at the leading edge with the purpose of delaying the stall of the trailing wing with respect to the angle of attack at which the main wing stalls without the use of a high lift device, a protection of the wing tip extension would necessitate a rather complex kinematics at a wing tip extension due to the varying complex curvature and the available small assembly room. Hence, wing tip extensions are commonly unprotected in terms of leading edge high lift device installment.

In the state of the art there are different solutions for improving the stall behavior of an unprotected wing tip extension. For example, it is known to install passive leading edge fences located inboard of the wing tip extension. However, it is questionable if this measure is capable of completely eliminating the stall in certain flight envelop bandwidths. It can however be assumed that it rather prevents localized stall areas from spreading further outboard.

BRIEF SUMMARY OF THE INVENTION

An aspect of the invention proposes a wing having a wing tip extension, wherein the wing is adapted for improving the stall behavior of the wing tip extension essentially without aerodynamic penalties due to passive devices that extend from the surface of the wing.

The wing for an aircraft according to an embodiment of the present invention comprises a leading edge and a wing tip extension extending from a connection region to the wing tip, wherein the wing tip extension comprises an arrangement of openings at least from the connection region to the wing tip along the leading edge, which openings are connected to an air conveying device for conveying air through the openings.

The wing described above may be based on a typical wing of a commercial aircraft that has a wing tip extension for improving the efficiency of the wing especially in cruise conditions. During flight conditions aside from the cruise phase, e.g. during takeoff and landing, clearly larger angles of attack are established. With conventional wing ends being not adaptable, a global shape optimization over a complete flight envelope is naturally weighing the associated shape impact with the time as a variable. This means that the final wing end geometry is the best for the complete envelope, while potentially performing inferior in comparison to a dedicated design for a single flight phase. This can lead to a decrease of lift and an increase of drag in flight scenarios, where the high lift devices are generally used.

The introduction of openings on the wing tip extension in a region near the leading edge enable the harmonization of the flow characteristics by sucking off or blowing out air, e.g. by injecting transonic or supersonic momentum fluid for equalizing the flow energy compared to the flow downstream of the adjacent slats or other high lift devices. For exciting vortex phenomena that also reduce or eliminate the separation, sucking off and/or blowing out air or a timely variation of both or one of them may be accomplished. Hence, pulsed blowing, pulsed blowing and suction as well as pulsed suction and all transitions between both may be realized. As such, local flow control does not depend on a flap or other deployable or fixed aerodynamic surface in the region of the leading edge of the wing tip extension and no separation associated drag is produced. Furthermore, as various research activities have successfully shown, flow improvement and separation delays by using different active flow control methods the effectiveness of the proposed measure is therefore not questionable.

Furthermore, the installment of the active flow control device is wing-internal and does not require any deployment room. Additionally and due to the internal installation, it hardly creates drag in off-design scenarios. It has to be considered that the degradation of high lift generation also depends on more complex, three-dimensional flow phenomena arising from local flow around the end face of the outboard leading edge high lift device facing the wing tip extension. For the exact positioning, extension and number of openings it is considered helpful to conduct a CFD analysis and high Reynolds number wind tunnel testing or even flight tests.

For the sake of clarity and completeness it is pointed out that a variety of different flow states may be used by the local flow control as explained above. First of all a steady blowing may take place through at least a section or all of the openings, meaning that a source of compressed air is steadily connected to the openings and therefore air is constantly delivered through the openings into the environment. Secondly, a steady suction may take place through at least a section or all of the openings, meaning that a pressure sink is steadily connected to the openings and therefore air is constantly sucked through the openings into the wing structure. Thirdly, steady blowing in a certain section of the wing and at the same time steady suction in another section of the wing may take place, e.g. depending on the stagnation line separating an upper and a lower part of the wing. Also, a timely varied blowing including regulation of the flow from void to maximum as well as a timely varied suction including regulation of the flow from void to a maximum may be possible. Lastly, suction and blowing may be applied in at least a section of the wing in an alternating manner.

In an advantageous embodiment, the wing comprises a leading edge high lift device arrangement with an outboard leading edge high lift device, wherein the arrangement of openings extends for up to 20% of the wing span from the outer edge of the outboard leading edge high lift device to an inboard direction. Thereby lateral vortices generated by the outboard end face of the outboard leading edge high lift device are manipulated in an efficient way as the local flow control region clearly overlaps with the outboard leading edge high lift device. Thereby, in addition to the flow separation which originally occurs due to the local stall phenomena on the wing tip extension the flow pattern generated by the end face of the outboard leading edge high lift device impinging on the wing tip is also harmonized.

In a further advantageous embodiment the arrangement of openings are positioned in a region in the proximity of the region with the highest flow instability in terms of separation tendency on the wing with extended high lift devices. This region covers the upper and lower surface of the wing, defined by the stagnation line, which represents the interface between the upper part and the lower part of the wing. Generally speaking, the stagnation line may be found in a region where the local wing or wing tip profile has its maximum curvature. Therein, a suction peak is present that tends to separate the flow on the wing as the flow has to overcome a distinct pressure increase on the wing surface. In influencing the local flow by means of introducing air into or sucking off air off the region of interest the separation is eliminated or at least clearly reduced. As the actual position of the stagnation point depends on the characteristics of the wing profile, the openings may be positioned on the upper side of the wing, the lower side of the wing or may extend from the lower side of the wing to its upper side. The active flow control methods will help reducing the stall tendency due to the recompression behind the main wing suction peak in the proximity of the highest airfoil curvature as well as separations associated to unfavorable vortical structures.

In an advantageous embodiment the openings may be selected from a group of openings, the group comprising bore holes, at least one slit introduced into the surface of the wing in a direction, which is parallel to the leading edge, at least one slit introduced into the surface of the wing in a direction, which is normal to the leading edge, and at least one slit introduced into the surface of the wing in a direction, which is at an angle to the leading edge. Thereby, an optimal arrangement of openings may be selected or compiled that considers the flow characteristics of the actual aircraft. It is not necessary that all openings are of the same shape or same diameter, the arrangement may also be compiled by different openings with different diameters or shapes depending on the requirements of the actual local flow characteristics.

It is pointed out that slits may be separated in a lateral direction or may be realized as slits that completely extend within the lateral boundaries of the region of interest. Individual slit sections may have lateral dimensions of 1 mm to 1000 mm, preferably 10 mm to 100 mm. If a plurality of slits that extend over the whole lateral dimension of the region of interest is used the slits may also be arranged parallel to each other.

In a further advantageous embodiment the arrangement of openings comprises bore holes and/or slits with a first angle in a plane normal to a global flow vector and a second angle parallel to the local flow vector. Therefore it is not necessary that bore holes and/or slits are exclusively machined perpendicularly to an outer panel or skin into the wing but may also cover bore holes and slits with a more sophisticated course. This design principle may be improved in wing cover panels with a certain thickness.

In a still further advantageous embodiment the wing comprises a front wing spar onto which a wing nose is attached, wherein the openings extend into the wing front spar or are connected to a duct in the front spar. The front spar may comprise or define at least a part of the duct and may further encase the air conveying device. Thereby, the front spar may act as a manifold for connecting a plurality of openings to a single air conveying device.

In an advantageous embodiment, the conveying device is adapted for sucking off air through the openings. Thereby, the generation of vortices may be reduced or eliminated as excess air accumulating in the region of interest covering the leading edge high lift device arrangement interruption can be reduced. If desired this can lead to a harmonization of the local flow and thus to an improved generation of high lift.

Alternatively, depending on the local flow characteristics, the air conveying device may also be adapted for blowing out air through the openings. Thereby, the local flow energy may be increased, leading to an increase in the local flow velocity and thereby delaying local stall or other flow separation phenomena. For this purpose the conveying device may be realized by various different devices. For instance, if a present source of compressed air can be used inside the aircraft, the air conveying device may be a valve or any other fluidic device that is adapted to switch on or off the air flow through the openings. Additionally, such a valve or other fluidic device may also be adapted to control or regulate the pressure of the compressed air that is lead to the openings, wherein the air conveying device may advantageously be connected to a control unit that is enabled to control the valve settings.

In an advantageous embodiment the air conveying device comprises a compressed air line that is in fluidic connection with the arrangement of openings. The compressed air line may be connectable to a source of compressed air inside the aircraft, such as a compressor of an electrical environmental control system, a pack of a bleed air driven environmental control system, a ram air inlet or a bleed air port itself.

In an advantageous embodiment the air conveying device comprises a suction air line that is in fluidic connection to the openings. The suction air line may be connectable to a pressure sink such as an inlet of a fan, a venturi nozzle or other means that are adapted for applying a pressure to the suction air line which is lower than the pressure at the openings.

In a still further advantageous embodiment, the conveying device is realized as a fan or compressor that independently compresses air for blowing out air through the openings. This may enable a rather compact integration of a local flow control device in the region of the leading edge high lift device interruption as no additional ducts or other devices for leading compressed air through the aircraft to this region are necessary.

In a still further embodiment the air conveying device comprises an air sucking apparatus. Such an air conveying device may also be realized as a fan wherein a suction port or an air inlet is connectable to the openings. This enables air to be sucked off in the wing tip extension region for decreasing the voracity of the air flow and delaying the stall of the flow.

In a still further embodiment the air conveying device is adapted for blowing out or sucking off air through the openings in an alternating manner. This may either be accomplished by alternatingly connecting a compressed air line or a suction line to the openings, or by connecting an air conveying device for blowing and another air conveying device for sucking off to the openings. Alternatively a piston arrangement or any other displacement body arrangement, such as a cylinder comprising a piston which is movably supported therein, may be connectable to the openings. By a reciprocating motion a sinusoidal pressure or a pressure with another timely shape function is applied to the openings, leading to an alternatingly application of suction and blowing. By this, vortices may be excited that prevent or reduce the flow separation phenomena.

In a further improved embodiment, the region of interest extends for up to 30% of the wing root chord from the leading edge to the trailing edge. This limits the local flow control to a region that is required for optimally affecting the local flow characteristics.

Another aspect of the invention relates to an aircraft comprising at least one wing with a wing tip extension realized as described above. Furthermore, the aircraft may comprise a source of compressed air, e.g. a component of an environmental control system, a bleed air port of a wing mounted engine, a ram air inlet or other means. The use of a bleed air port may be advantageous as the distance from the engine to the arrangement of openings may be shorter than the distance to other means installed inside the aircraft fuselage. For preventing temperatures that exceed a maximum allowable temperature for the wing structure due to its material properties either a cooler may be used for cooling bleed air routed to an environmental control system or other means or it may be possible to introduce an additional bleed air port that delivers bleed air at a lower temperature, e.g. in one of the first two compressor stages.

Still further, an aspect of the invention relates to a method for reducing aerodynamic drag and improving maximum lift by basically accomplishing the step of conveying air through an arrangement of openings situated in a region covering an add-on body on a wing when leading edge high lift devices are extended.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, irrespective of their composition in the individual claims or their interrelationships. Furthermore, identical or similar components in the figures have the same reference characters.

FIGS. 2a to 2f schematically show different conveying devices.

DETAILED DESCRIPTION

Figure 1A:
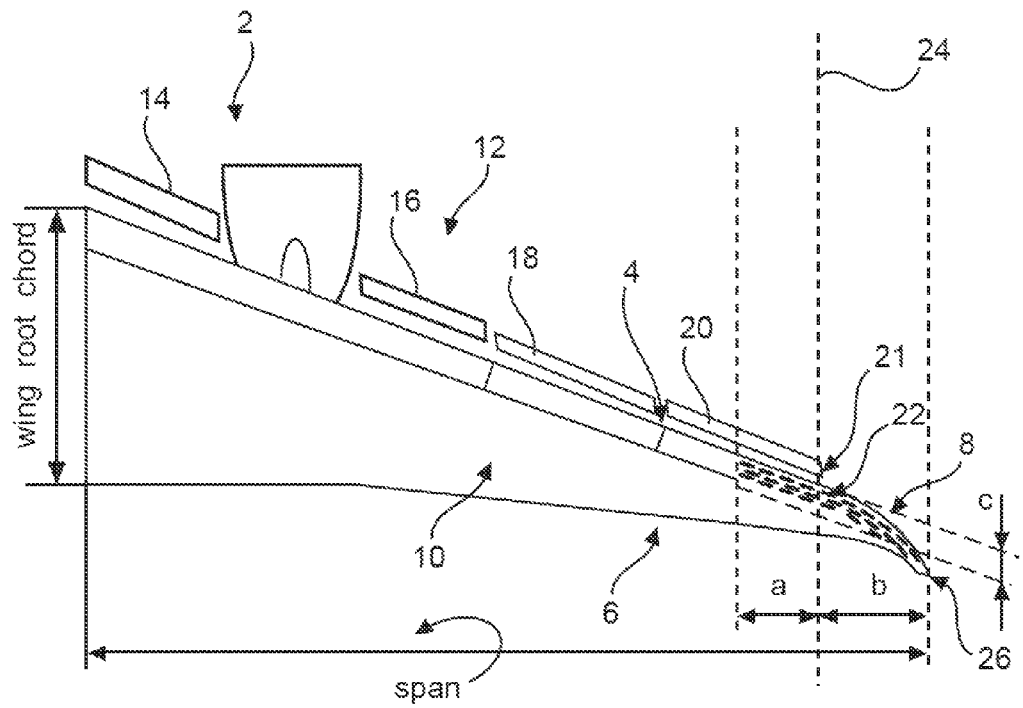
FIGS. 1a and 1b show the wing according to the invention in two different schematic views.

FIG. 1a shows a schematic view on a wing 2 according to an embodiment of the invention. The wing 2 comprises a leading edge 4, a trailing edge 6 and a wing tip extension 8. The wing tip extension 8 may comprise a shape with a more or less complex curvature and usually a dihedral angle at an end region. It is connected to or integrated in an outboard region of a main wing 10 which comprises a leading edge high lift device arrangement consisting of individual slats 14, 16, 18 and 20, wherein slat 20 is an outboard slat. The actual number of slats 14 to 20 per wing 2 is only chosen as an example and is not meant for limiting the scope of protection.

The outboard slat 20 is located adjacent to the wing tip extension 8, such that after deployment an end face 21 the outboard slat 20 is located in an upstream location influencing the flow around or impinging onto the wing tip extension 8. Furthermore, due to a clearly increased angle of attack of the wing 2 during takeoff or landing phases the flow characteristics on the unprotected wing tip extension 8 may be inhomogeneous and stall and flow separation phenomena, respectively, occur.

For harmonizing the local flow on the wing tip extension 8 and substantially avoiding the separation of the flow on the wing tip extension 8 an arrangement of openings 22 is positioned on the wing tip extension 8 and in a region adjacent to it located further inboard. These openings 22 are a central part of a local flow control apparatus for influencing a local flow through sucking off air or blowing out air.

For improving the aerodynamic lift and reducing the drag it is preferable to let the arrangement of openings 22 extend for up to 20% of the wingspan from an outer edge 24 of the outboard slat 20 to a wing root region (indicated with measure a) and up to the wing tip 26 (indicated with measure b). Furthermore, the arrangement may extend for up to 30% of the wing root chord from the leading edge 4 to the trailing edge 6, as indicated with measure c.

The openings 22 may be slits or bore holes having a width or diameter of 0.1 mm to 20 mm, wherein slits that are separated in a lateral direction may each have a lateral dimension or width of 1 mm to 1000 mm and preferably between 10 mm and 100 mm. Slit sections with an even larger lateral extension are also possible, e.g. up to 1000 mm or even more. It is imaginable that, as an alternative, one or more narrow slits may be produced that completely extend within the lateral boundaries of the region of interest. The slits may be oriented spanwise, wherein the direction of extension is substantially parallel to the leading edge 4. If a plurality of these slits is used they may be arranged in parallel to each other. Besides this, extensions vertical to the spanwise direction or angular thereto are imaginable. If the wing tip 8 has an increasing sweep angle, the slits may continuously be aligned parallel to the local leading edge if a spanwise extension is desired.

It may be possible to use a number of bore holes e.g. 1 to 10000 or a number of slits e.g. 1 to 300. Furthermore, a combination of bore holes and slits may also be possible as well as the use of plurality of different dimensions throughout the openings, depending on the local flow characteristics.

Figure 1B:
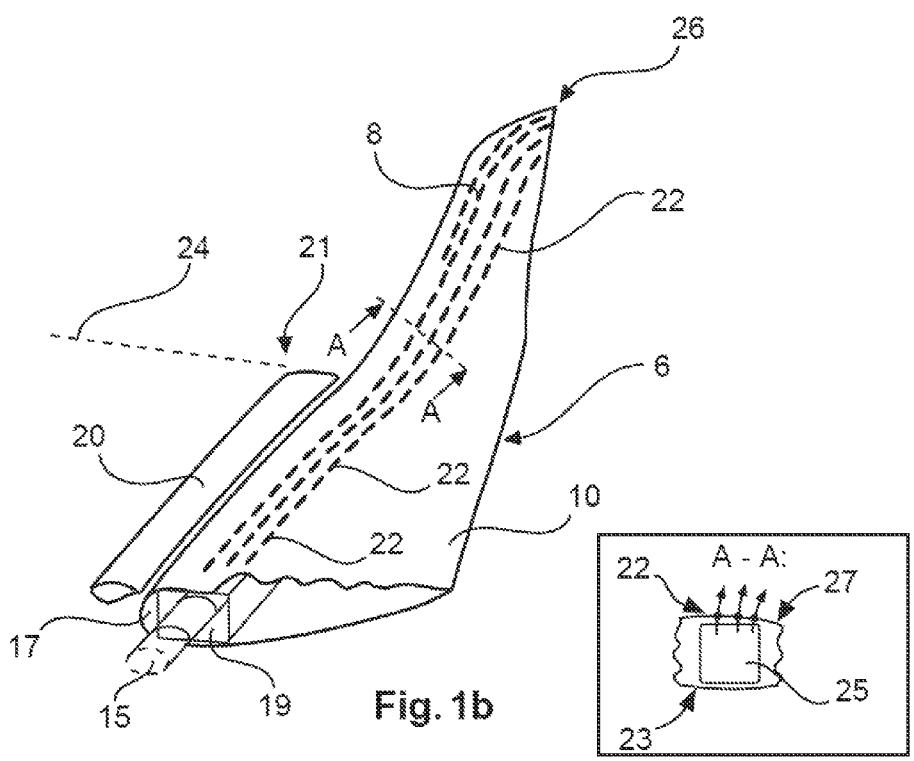

FIG. 1b demonstrates, in a three dimensional view, the region which comprises the arrangement of openings 22. The end of the main wing 10 leads to the wing tip extension 8 that has a clearly increased dihedral angle relative to the main wing 10 and a specific special curvature with the main purpose of improving the cruise performance. For avoiding flow separation and a heavy influence of flow from the end face 1 of the outboard high lift device 20, openings 22 are arranged on the wing tip extension 8 itself and for up to 20% of the wingspan from the outer edge of the outboard slat 20 in an inboard direction. The openings are exemplarily realized as slits in a plurality of rows that substantially extend parallel to each other and the local leading edge.

The openings 22 are connected to a conveying device (not shown in FIG. 1b), which conveying device may lead compressed air to the openings 22. For example, an air line 15 may run from a further inboard direction within a front spar 19 of the wing, to which a nose element 17 is connected, to the openings 22, wherein the openings 22 may furthermore be connected to a manifold 25 positioned between the openings 22 and the air line 15 (further exemplarily depicted in a sectional view A-A). The manifold 24 may be realized by a chamber consisting of an upper skin 27 of the wing and a lower skin 23 connected to the upper skin under creation of a hollow space. As a source of compressed air, a bleed air port, a component of an environmental control system, a separate fan or compressor, a ram air inlet or other means is imaginable. As an alternative, the air line 15 may also be a suction line that is connected to a pressure sink in order to suck off air from the openings 22.

FIG. 2a demonstrates the supply of air to the openings 22 by means of air taken from an environmental control system 28, for example from the pack or from a compressed air line. Compressed air is thereby provided to a conveying device 30 which may comprise a valve that is adapted to switch on or off an air supply. The conveying device 30 may furthermore comprise a manifold that provides air to several openings 22 from one single supply line. As an alternative, the manifold may be integrated into the wing structure as explained above.

As the supply of air is only necessary in high lift conditions, it is preferable that the conveying device 30 is connected to a control unit 32 or any other electronic means that is essential for the flight control, which control unit 32 may furthermore be connected to the flight control computer, a flight management system, or may be realized as a part of the flight control computer or the flight management system. The connection to the control unit 32 is necessary or advantageous for switching on or off the supply and may also provide the ability to regulate the volume flow when considering the actual air speed and the required air flow.

FIG. 2b demonstrates an alternate solution with an aircraft engine 9 that delivers bleed air to the conveying device 30, which conveying device 30 may be the same as in FIG. 2a. As bleed air may comprise a temperature that exceeds the maximum allowable temperature for the opening 22 in the aircraft structure, a cooler or a pre-cooler may be installed up-stream of the conveying device 30. This cooler is depicted with dotted line 34. Usually, bleed air systems in an aircraft comprise at least one of these coolers 34. As an alternative, an additional bleed air port may be provided for lowering the pressure and temperature of this pressurized air source.

In the case where there is either no bleed air or it is not wanted/necessary/desired to install air ducts from a component of the environmental control system to the conveying device 30, it may be possible to use a ram air inlet 36 connected to the conveying device 30, as shown in FIG. 2c. The ram air inlet may be installed in the pylon of the engine 9 or another region of a high pressure field in the close proximity to the area of active flow control application in order to prevent longish ram air ducts inside the aircraft. Preferably, the ram air inlet 36 is closable by a flap or other means in order to prevent unwanted drag during cruise flight.

In FIG. 2d, a synthetic jet apparatus having an exemplary piston type driven by a combination of an eccentric and an electric motor is shown. The air conveying device 38 that may be connected to the control unit 32, which conveying device 38 creates a local flow of surrounding air moving back and forth through the openings 22 in an alternating manner. Alternative solutions for such synthetic jet apparatuses are known in the state of the art, comprising e.g. electromagnetic drivers and piezoelectric drivers. The operating frequency may exceed 1 Hz and may reach up to some hundred Hz, depending on the size of the individual openings 22. By using a synthetic jet apparatus, the necessary flow rate of air to be conveyed can be eliminated completely. This further results in the transfer of energy into the local flow field, thereby directly influencing the separation characteristics and harmonizing the total flow. An advantage lies in the absence of valves and longish air lines.

FIG. 2e demonstrates the use of a compressor 40 connected to an air source 42. The compressed air may be supplied to the openings 22, wherein a further valve arrangement may be present, which is not depicted herein.

FIG. 2f demonstrates the use of a compressed air line 46 and a low pressure line 48 connected to a conveying device 44 that supplies air to the openings 22 or draws off air from the openings 22. By the connection to the control unit 32 the air conveying device 44 enables an adaption to the actual local flow characteristics.

Figure 3:
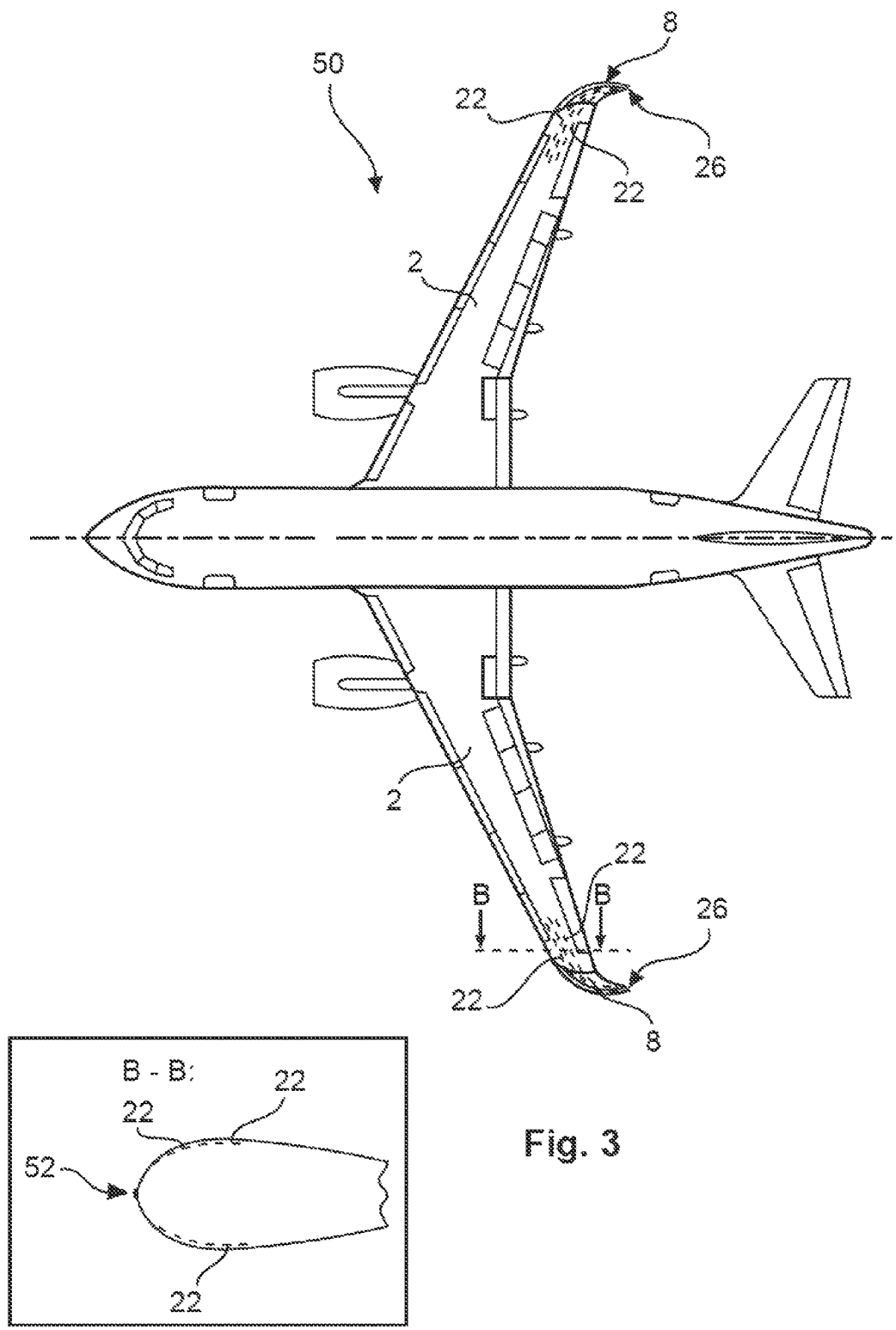
FIG. 3 shows an aircraft with a wing according to the invention.

FIG. 3 shows an aircraft 50 with a wing 2 having a number of openings 22 in a wing tip region. All of the above-mentioned alternate arrangements regarding the supply of compressed air or the source of low pressure are useable herein. For the sake of completeness a completely exemplary stagnation point 52 is shown at a front of the profile of the wing surface. As presented above, the location of the openings is not limited to the upper side of the wing. Therefore, in a sectional view B-B a section of openings 22 at an upper side as well as a section of openings at a lower side of the wing 2 is presented. Again, this figure is not binding, the stagnation point 52 as well as the location of the openings 22 shall be adjusted according to the expected or measured flow characteristics.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A wing for an aircraft, comprising:
   a main wing;
   a leading edge;
   a wing tip extension extending from an end of the main wing to a wing tip; and
   a leading edge high lift device arrangement along the main wing, the leading edge high lift device arrangement including an outboard leading edge high lift device adjacent to the wing tip, the outboard leading edge high lift device having an outer edge at an end face facing the wing tip such that when the outboard leading edge high lift device is deployed the end face is located in an upstream location influencing the flow around or impinging onto the wing tip extension,
   wherein the wing tip extension comprises an arrangement of openings at least from the end of a main wing region to the wing tip along the leading edge, said openings connected to an air conveying device for conveying air through the openings; and
   wherein the arrangement of openings extends for up to 20% of the wingspan from the outer edge at the end face of the outboard leading edge high lift device in an inboard direction toward the main wing.

2. The wing of claim 1, wherein the arrangement of openings is positioned in the proximity of the region with the highest flow instability in terms of separation tendency on the wing with extended high lift devices.

3. The wing of claim 1, wherein the openings are selected from a group of openings, the group consisting of
   at least one bore hole,
   at least one slit introduced into the surface of the wing in a direction parallel to the leading edge,
   at least one slit introduced into the surface of the wing in a direction normal to the leading edge,
   at least one slit introduced into the surface of the surface element in a direction at an angle to the leading edge.

4. The wing of claim 1,
   wherein the arrangement of openings comprises at least one of bore holes and slits with a first angle in a plane normal to a global flow vector and a second angle parallel to the local flow vector.

5. The wing of claim 1, further comprising a front wing spar; and a nose element attached to the front wing spar, wherein the openings extend into the front wing spar or are connected to an air line in the front wing spar.

6. The wing of claim 1, wherein the conveying device is adapted for sucking off air through the openings.

7. The wing of claim 1, wherein the conveying device is adapted for blowing out air through the openings.

8. The wing of claim 1, wherein the conveying device is connected to a compressed air line and is connectable to the openings in a fluidic manner.

9. The wing of claim 1, wherein the conveying device is connected to a suction air line and is connectable to the openings in a fluidic manner.

10. The wing of claim 1, wherein the conveying device is configured as a compressor in fluidic connection to the openings or wherein the conveying device is connected to an air sucking device and is connectable to openings in a fluidic manner.

11. The wing of claim 1, wherein the conveying device is adapted for blowing out and sucking off air through the openings in an alternating manner.

12. The wing of claim 1, wherein the arrangement of openings extends for up to 30% of the wing root chord from the leading edge to the trailing edge.

13. A method for reducing aerodynamic drag and improving maximum lift, comprising conveying air through an arrangement of openings in a wing tip extension from an end of a main wing region to a wing tip by an air conveying device, the main wing region comprising a leading edge high lift device arrangement including an outboard leading edge high lift device adjacent to the wing tip and having an outer edge at an end face facing the wing tip such that when the outboard leading edge high lift device is deployed the end face is located in an upstream location influencing the flow around or impinging onto the wing tip extension, wherein the arrangement of openings extends for up to 20% of the wingspan from the outer edge of an outboard leading edge high lift device in an inboard direction toward the main wing.

14. An aircraft, comprising a wing, said wing comprising:
a main wing;
a leading edge;
a wing tip extension extending from an end of the main wing to a wing tip; and
a leading edge high lift device arrangement along the main wing, the leading edge high lift device arrangement including an outboard leading edge high lift device adjacent to the wing tip, the outboard leading edge high lift device having an outer edge at an end face facing the wing tip such that when the outboard leading edge high lift device is deployed the end face is located in an upstream location influencing the flow around or impinging onto the wing tip extension,
wherein the wing tip extension comprises an arrangement of openings at least from the end of a main wing region to the wing tip along the leading edge, said openings connected to an air conveying device for conveying air through the openings; and
wherein the arrangement of openings extends for up to 20% of the wingspan from the outer edge at the end face of the outboard leading edge high lift device in an inboard direction toward the main wing.

\* \* \* \* \*